May 10, 1949.  J. REESE ET AL  2,469,475
FOLDING CARRIAGE
Filed June 6, 1947

INVENTORS
Wm. C. Troendle
John Reese
BY Charles R. Fay  ATTORNEYS.

Patented May 10, 1949

2,469,475

UNITED STATES PATENT OFFICE 2,469,475

FOLDING CARRIAGE

John Reese and William C. Troendle, Gardner, Mass., assignors to Thayer Company, Gardner, Mass., a corporation of Massachusetts Application June 6, 1947, Serial No. 752,882

2 Claims. (Cl. 280—36)

1

This invention relates in general to folding carriages and more particularly to that type of carriage which is adapted for infants and also for dolls.

The principal object of the invention resides in the provision of a folding carriage avoiding the use of exterior "scissors linkages" or the usual cross linkages which are used in the prior art to hold the carriage in extended condition and which form hard members apt to bruise the occupant.

Further objects of the invention include the provision of a carriage or similar vehicle having wheels upon the axles of which are mounted a pair of parallel spring strips turned up at their ends and provided with the usual pivot shackles, said pivot shackles appearing at each end of the carriage in pairs and each pair receiving and mounting a cross rod, said cross rods being parallel, and adjacent each shackle there being provided a plate for the cross rods, these plates being secured to and supporting a pair of parallel longitudinal bars one at each side of the carriage, said bars extending upwardly at the front of the carriage and having pivoted thereto a pusher handle, said pusher handle being provided with latch means to secure the same selectively in either upright position with the carriage body extended or folded over position with the carriage body folded, and including connection links between the pusher handle and a frame for the carriage body so that the pusher handle supports the frame at the front end of the carriage; and the provision of foldable or extensible linkages at the rear end of the carriage, these linkages being pivotally mounted for the purpose of holding the rear end of the carriage body folded or extended, said linkages including means for latching them in extended condition.

A still further object of the invention resides in the provision of a folding frame for folding baby carriages, said frame comprising members located at the front and rear of the body of the carriage and completely avoiding the usual cross linkages intermediate the ends of the carriage so that the entire sides of the baby carriage are free of any linkages or other rigid members, thereby providing that the occupant of the carriage is completely supported both on the bottom of the carriage and at the sides by flexible material completely out of the range of any rigid members.

Other objects and advantages of the invention will appear hereinafter.

Reference is to be had to the accompanying drawings in which

2

Figure 1:
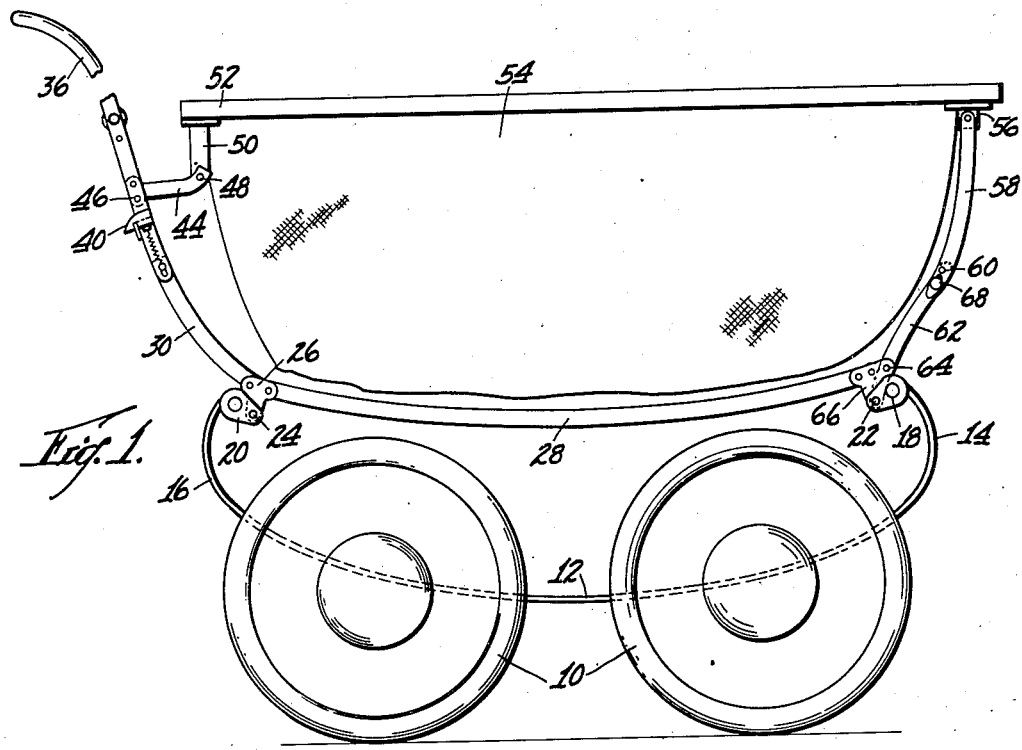
Figure 2:
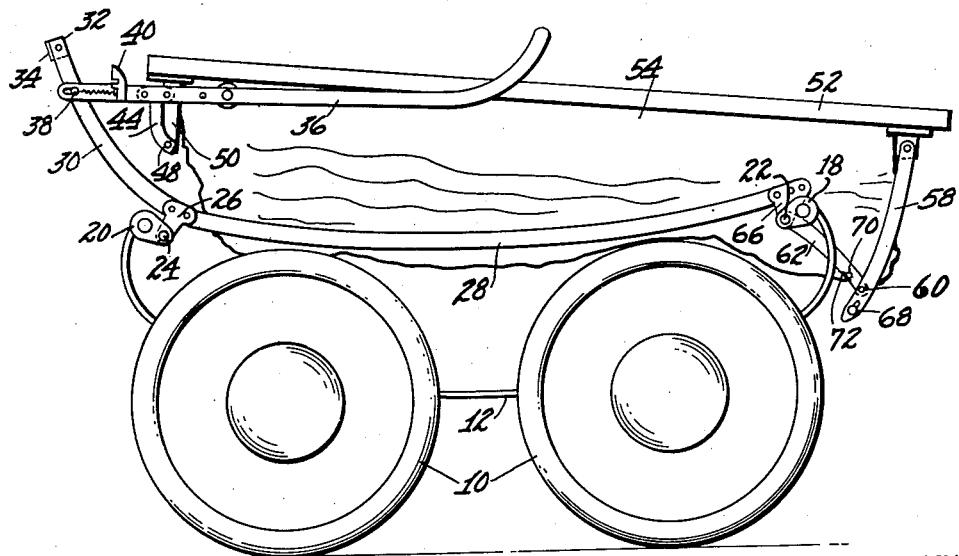

Fig. 1 is a view in side elevation of the new carriage showing the same extended; and Fig. 2 is a similar view showing the carriage in folded condition.

As shown in the drawing, the carriage is provided with wheels 10 mounted on axles which are not shown but which are located as usual in the art and are connected to and support a pair of parallel spring rods 12 which curve upwardly and inwardly at their ends as at 14 and 16. These spring rods pivotally mount conventional shackles 18 and 20 at their free ends and the shackles in turn mount cross rods 22 and 24, these cross rods extending the full width of the carriage and being connected to similar shackles and spring rods at the opposite side of the carriage as will be clearly apparent to those skilled in the art.

The cross rod 24 is at the front of the carriage and adjacent the shackles 20 there is mounted thereon a cross rod plate 26. This cross rod plate is riveted or otherwise secured to a curved bar 28 which extends the length of the carriage and is curved upwardly at the front as at 30 terminating as best shown in Fig. 2 at 32 and carrying a lug 34.

A pusher handle 36 is pivoted on a pin 38 to bar 28 and is provided at each side of the carriage with a spring pressed latch 40 for the purpose of latching on the lug 34 to hold the pusher handle in upright condition as shown in Fig. 1.

A connecting link 44 is fixedly secured as, for instance, by rivets 46 to the pusher handle 36 and this connecting link is provided with a pivot pin 48 for pivotal securement to a depending fixed strap 50 secured to the frame 52 of the carriage body which is indicated at 54. The carriage body 54 depends from the frame 52 and has no other support.

At the rear of the carriage the frame 52 is provided with a fixed depending strap 56 to which is pivotally mounted a link 58 in turn pivoted at 60 to another link 62. Link 62 is pivoted at 64 to a rear cross rod plate 66 fixedly secured to the bar 28 and connecting bar 28 with a cross rod 22. A well-known type spring pressed catch 68 may be mounted on link 58 for selective latching in a hole 70 in link 62, there being a cam surface 72 to direct the spring pressed pin 68 into the hole 70 when the frame 52 raised at the rear of the carriage.

With the carriage extended as in Fig. 1, the latch 40 is raised manually and the pusher handle 36 then pivots in a clockwise direction from the position of Fig. 1 to the position of Fig. 2, link 44 carrying the strap 50 downwardly and thereby letting the carriage body and frame down. The pin 68 is then pulled to retract it from hole 70 whereupon the linkage 58, 62 will collapse downwardly to the position shown in Fig. 2 letting the rear end of the carriage body and frame down to the Fig. 2 position.

In order to again extend the carriage it is merely necessary to pull upwards on the pusher handle 36 in which case the link 44 pulls upwardly on strap 50 raising the front end of the carriage and latch 40 will snap over and become secured to the lug 34. The rear end of the carriage frame is then pulled up and the pin 68 will snap into hole 70 in the Fig. 1 position as will be readily apparent.

It is to be understood that the mechanism here shown is exactly duplicated at the other side of the carriage, but inasmuch as the construction is a duplication no useful purpose is to be secured by showing the opposite side.

Having thus described our invention and the advantages thereof, we do not wish to be limited to the details herein disclosed otherwise than as set forth in the claims, but what we claim is:

1. In a folding carriage having a body frame, wheels and longitudinal supporting spring strips, a pivoted shackle at each end of each spring strip, a cross rod mounted on the shackles at each end of the carriage, longitudinal bars mounted on the cross rods, a pusher handle pivotally mounted on the bars at one end of the carriage, a supporting folding linkage between the handle and carriage body frame, latch means to releasably hold the handle extended, a folding linkage at the other end of the carriage and supporting the same, and a releasable latch for the last named folding linkage.

2. A folding carriage comprising wheels, spring strips extending from end to end of the carriage, pivoted shackles on the ends of the spring strips, a longitudinal bar for and substantially co-extensive with each spring strip, the bars being supported on the shackles, each bar extending generally upwardly at one end of the carriage, a pusher handle pivoted to the upwardly extending ends of the bars, latch means between the bars and pusher handle, a rigid connecting link on the pusher handle at each side of the carriage, a carriage body frame, depending rigid straps on the frame, the straps and connecting links being pivoted together, folding means at the opposite end of the carriage, said folding means connecting the bars and frame, and a latch for said last named means.

JOHN REESE.
WILLIAM C. TROENDLE.

REFERENCES CITED

The following references are of record in the file of this patent:

UNITED STATES PATENTS

| Number | Name | Date |
|---|---|---|
| 1,053,455 | Thayer | Feb. 18, 1913 |
| 2,037,988 | Larsen | Apr. 21, 1936 |
| 2,296,193 | Siebert | Sept. 15, 1942 |

FOREIGN PATENTS

| Number | Country | Date |
|---|---|---|
| 374,369 | Great Britain | June 9, 1932 |